Feb. 3, 1959   H. DIX   2,871,954
JET OPERATED ROTARY LIFTING VEHICLE
Filed Oct. 7, 1957   2 Sheets-Sheet 1
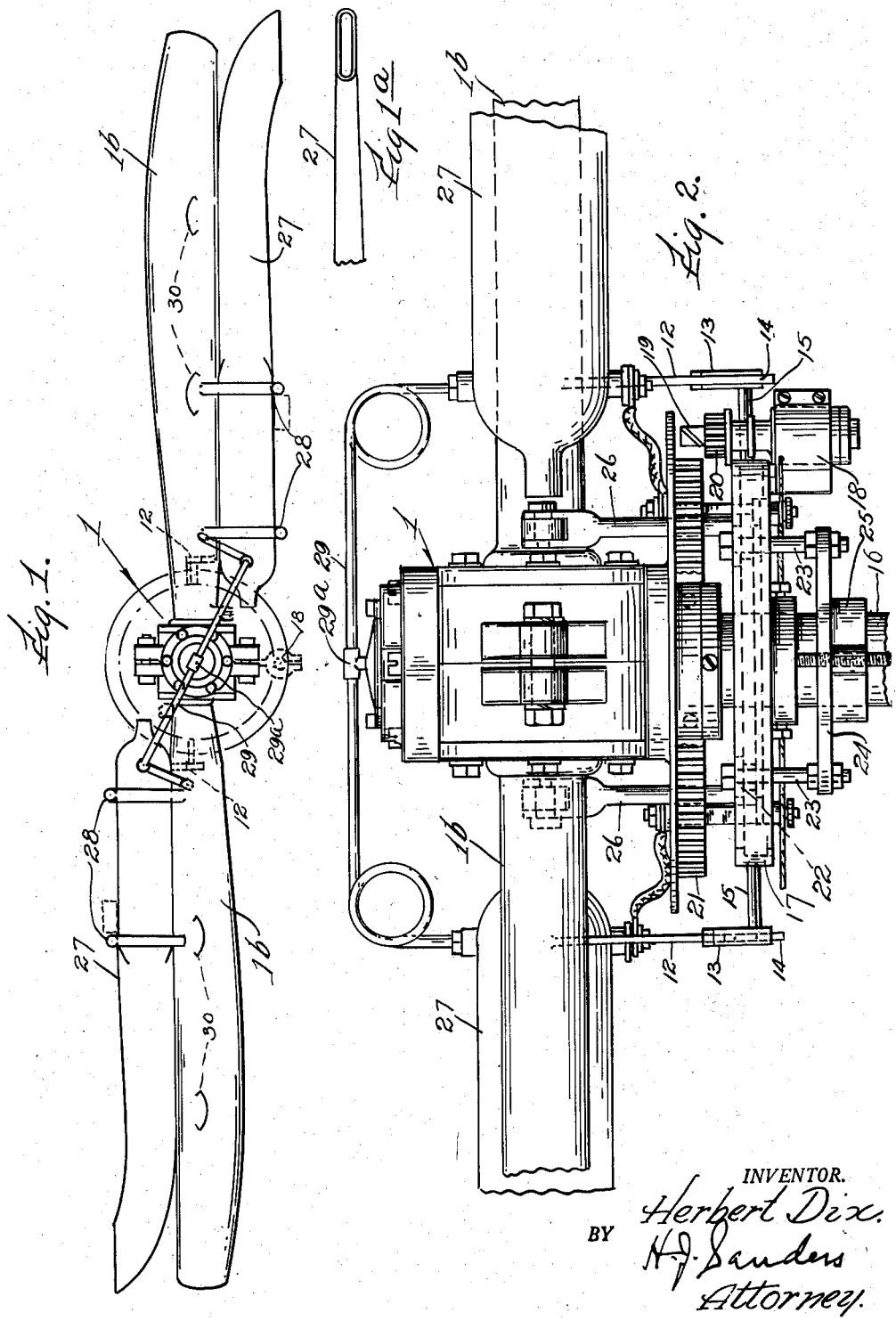
INVENTOR.
Herbert Dix.
BY H. J. Sanders
Attorney.

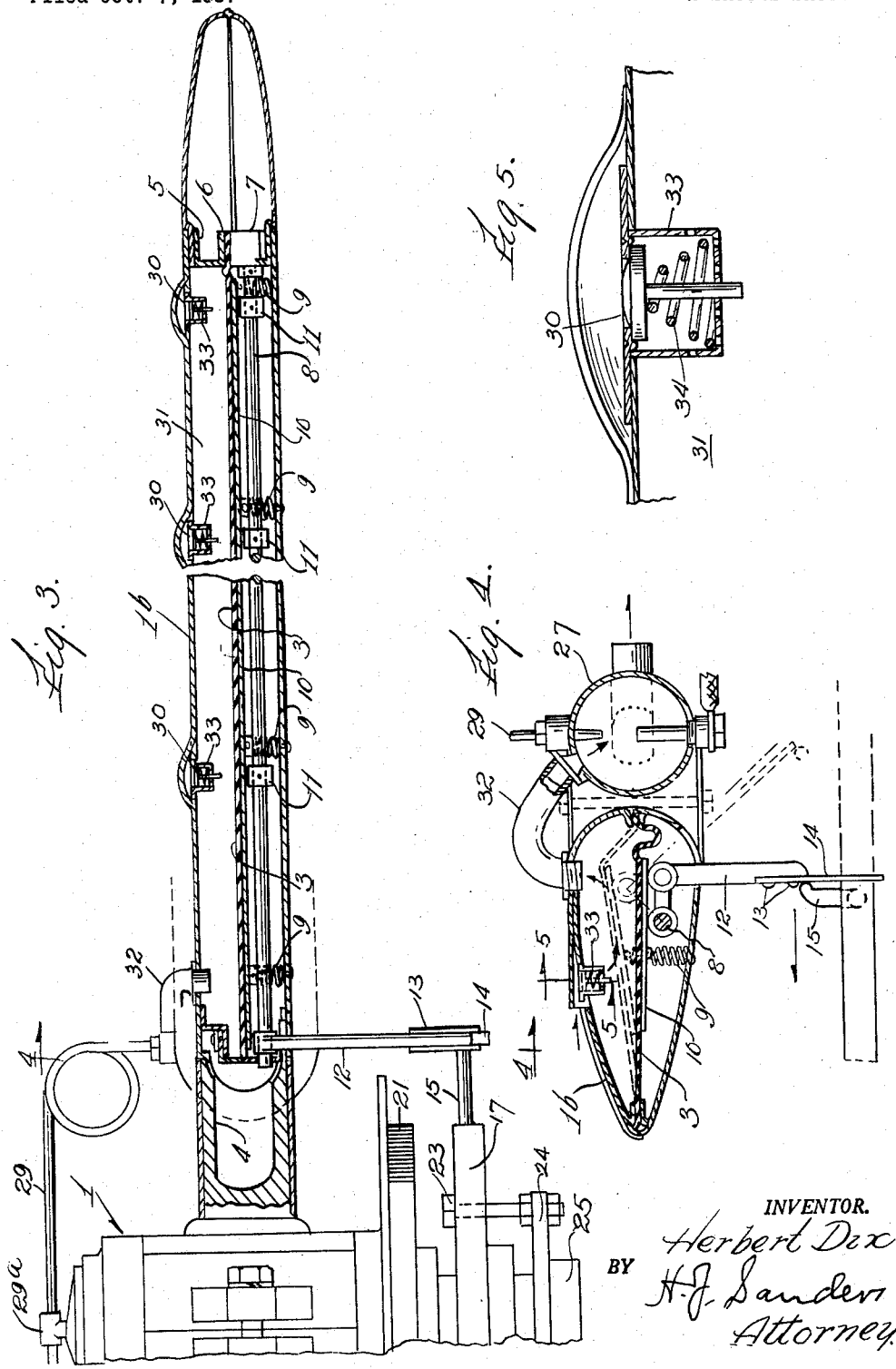

United States Patent Office 2,871,954
Patented Feb. 3, 1959

2,871,954
JET OPERATED ROTARY LIFTING VEHICLE
Herbert Dix, Chicago, Ill.
Application October 7, 1957, Serial No. 688,535
5 Claims. (Cl. 170—135.4)

This invention relates to helicopters and more specifically to a jet propelled helicopter rotor. One object is to provide a helicopter rotor provided with two diametrically opposed rotary blades or wings each of which is provided with a pulse jet engine, the said engines arranged upon relatively opposite edges of said wings with their exhausts disposed in opposite directions, said engines extending inwardly from the tips of said wings longitudinally substantially to the inner or root ends of said wings thus avoiding or greatly reducing the undesirable effects of motors located at the tips only of the wings.

A further object is to provide a helicopter rotor havings wings or blades of hollow structure having therewithin air compressors to provide compressed air, as the rotor operates, to the pulse jet engines for driving the wings.

A further object is to provide a helicopter rotor having wings provided each with a diaphragm type compressor that delivers constant volume and pressure at fast or slow wing speeds. A still further object is to provide a helicopter rotor provided with inexpensive and greatly simplified powering means; that is efficient in use and highly responsive in operation.

With the foregoing and other objects in view my invention will be readily understood from the following description of a preferred embodiment as set forth in the following specification, defined in the claims and illustrated in the accompanying drawings forming part of this disclosure wherein:

Fig. 1 is a top plan view of a helicopter rotor according to a preferred form of my invention.

Fig. 1a is a fragmentary view of one engine at its exhaust end.

Fig. 2 is a fragmentary elevational view of Fig. 1 disclosing parts of the rotary wings and a view of parts arranged immediately below the hub.

Fig. 3 is a view, partly in elevation, partly broken away, and partly in longitudinal section.

Fig. 4 is a detail longitudinal sectional view through Fig. 3 approximately on the line 4—4, and, Fig. 5 is a detail sectional view through Fig. 4 on the line 5—5.

The reference numeral 1 denotes a housing or hub providing anchorage for the helicopter rotor wings or blades that extend from opposite sides of said hub in a straight line. As the blades are of a common structure the description of one will be sufficient for both. Each wing is of elongated hollow structure secured at its inner or root end to the hub in conventional manner, the wing being divided longitudinally and centrally by a partition 3 extending from its outer free end inwardly to a brace structure 4. The partition 3 is desirably a rubber impregnated fabric diaphragm or the like.

Arranged inside the wing adjacent the outer end thereof is an anchorage 5 composed of sections 6, 7 serving as a bearing for one end of the oscillating shaft 8. Arranged in spaced relation longitudinally of said wing within same are the springs 9 secured at their ends by the wing and by a resilient brace plate 10 secured to the diaphragm and extending longitudinally thereof. Fast to the oscillating shaft 8 and spaced from each other are the arcuate cams 11 that abut said plate and as the shaft oscillates lift said plate intermittently together with the diaphragm to compress the air within the wing.

The inner end of shaft 8 passes through the perforate end of a lever 12 that extends through the wall of the wing and is secured by bolts 13 to a piece 14 that oscillates with said lever 12 and strikes a pin 15, one upon each side of a vertical stationary shaft 16, Fig. 2, extending upwardly through the hub 1 and downwardly to, and fastened to the conventional helicopter structure, said pins 15 secured to a stationary mounting plate 17 of circular shape extending completely about said shaft 16 and secured thereto.

Secured to one edge of said plate 17 as by bolting or riveting is a starting motor 18 having its shaft 19 provided with a pinion 20 adapted for meshing engagement with a ring gear 21 operatively mounted to said hub 1, said gear 21 extending completely about the hub for rotating same. Imbedded in said plate 17 is a ring 22 to which are secured the bolts 23, 23 connected by a yoke 24 provided with a collar 25 keyed to said shaft 16, this structure comprising part of means for feathering the rotor wings, said structure including opposed levers 26, 26 secured to the shaft of said rotor wings. The feathering of said wings is controlled by conventional lever and extension cable (not shown).

Secured to each rotor wing upon opposite sides thereof is a pulse jet engine 27 by straps 28, each engine receiving fuel from a conventional fuel tank and pump through pipe 29 with feed pipe 29a extending to the gas tank. In order to supply necessary compressed air to the pulse jet engines I provide means, as described previously, for oscillating the diaphragm thus drawing air through intake valves 30 from the atmosphere arranged upon the upper half of each wing within compartment space 31, the air being evacuated through pipe 32 into said pulse jet engines, the air for the space 31 coming through said intake valves 30 each provided with a check valve 33 provided with a soft spring 34. This mechanism is started conventionally, its rise being controlled by feathering the blades and it is guided in conventional manner. To descend the wings are feathered to a neutral position. In starting, the diaphragm full volume and pressure of compressed air to the pulse jet engines is had, even though the rotor is revolving at slow speed at that time.

Rotor rotation causes levers 12 to strike pins 15 simultaneously which oscillates cams 11 thus raising the diaphragm and intermittently compressing air in space 31 forcing it through pipe 32 into pulse jet engines. When the starter is energized the ring gear 21 is rotated together with the wings 1b, the hub rotating about the shaft 16. The jet engines 27 secured to the wings then perpetuate the rotation in the following manner: The exhausts from the jet engines located at relatively remote terminals of said engines and upon the trailing edges of the wings provide impulses in a common direction thus impelling the vehicle.

What is claimed is:

1. A jet operated rotary lifting vehicle comprising a support, a rotary device mounted upon said support and including a hub, diametrically opposed hollow wings secured to said hub, a resilient partition extending longitudinally of each wing dividing it into separate compartments, intake air valves in each wing for admitting atmospheric air into one compartment of each wing, jet propulsion engines secured to said wings upon their trailing edges, means connecting said resilient partition and the wall of each wing for yieldingly retaining said partition in predetermined normal position, an oscillating shaft extending longitudinally of each wing in a second compartment of same, cam means carried by said oscillating shaft operatively associated with said partition for flexing same as said shaft oscillates, rotating means for said hub carried by said support, power transmission means operatively connecting said hub rotating means to said oscillating shaft, starting means for said rotating means, and air transmission means connecting said air compartment to the said jet engines under pressure as said partition is flexed.

2. A jet operated rotary lifting vehicle comprising a support, a rotary device mounted upon said support and including a hub, diametrically opposed hollow wings secured at their root ends to said hub and extending outwardly therefrom, a resilient partition extending longitudinally of each wing dividing same into separate compartments, air intake valves in each wing for supplying atmospheric into one compartment of each wing, jet propulsion engines secured to said wings upon their trailing edges and extending substantially from end to end thereof, means connecting said partition and the wall of its wing in normal position, an oscillating shaft extending longitudinally of each wing in a second compartment thereof, cam means carried by said oscillating shaft operatively associated with said partition for flexing same as said shaft oscillates, rotating means for said hub connecting said hub and said support, power transmission means operatively connecting said hub rotating means to said oscillating shaft, starting means for said hub rotating means, and compressed air transmission means connecting said wing air compartment to said jet engines as said partition is flexed.

3. A jet operated lifting vehicle comprising a support, a rotary device mounted upon said support including a hub, diametrically opposed hollow wings secured to said hub, a resilient partition extending longitudinally of each wing dividing same into separate compartments, air intake valves in each wing for admitting air into one compartment of each wing, jet propulsion engines secured to said wings upon their trailing edges, means connecting said resilient partition and the wall of each wing yieldingly retaining said partition in predetermined normal stationary position, an oscillating shaft extending longitudinally of each wing in a second compartment of each wing, cam means carried by said oscillating shaft operatively associated with said partition for flexing same as said shaft oscillates, hub rotating means connecting said hub and said support, said hub rotating means including a ring gear carried by said hub and a mounting plate carried by said support, starting means carried by said support for starting engagement with said ring gear, actuating means for said oscillating shaft carried by said mounting plate operative as said mounting plate rotates, and air transmission means connecting each wing air compartment to the said jet engines operative as said partition is flexed.

4. A jet operated rotary lifting vehicle comprising a support, a rotary device mounted upon said support and including a hub, opposed hollow wings secured to said hub, a resilient partition extending longitudinally of each wing dividing same into separate compartments, one of said compartments defining a compressed air compartment, air intake valves in each wing for admitting air into said compressed air compartment, jet propulsion engines secured to said wings upon their trailing edges, means connecting said resilient partition and the wall of each wing yieldingly retaining said partition in normal position, means within a second wing compartment for yieldingly intermittently actuating said partition, rotating means for said hub carried by said support, power transmission means operatively connecting said hub rotating means to said partition and actuating said partition as said hub rotates, starting means for said hub rotating means, and air transmission means connecting said compressed air compartment to the said jet engines as said partition is actuated.

5. A jet operated lifting vehicle comprising a support, a rotary device mounted upon said support and including a hub, diametrically opposed hollow rotary wings secured to said hub, a resilient partition extending longitudinally and centrally of each wing dividing same into compartments, intake air check valves in each wing for admitting air into one compartment of each wing, jet propulsion engines secured to said wings along their trailing edges, means connecting said partition and the wall of each wing for yieldingly retaining said partition in normal position, oscillatory means within each air compartment operatively engaging said resilient partition flexing same, oscillatory power transmission means operatively connecting said hub to said resilient partition, rotating means for said hub, starting means for said hub rotating means, and air transmission means connecting each wing air compartment to said jet engines as said partition is flexed, said air transmission means delivering air under constant pressure and volume at all wing speeds.

References Cited in the file of this patent
UNITED STATES PATENTS

| | | |
|---|---|---|
| 2,394,513 | Chappedelaine | Feb. 5, 1946 |
| 2,464,651 | Pecker | Mar. 15, 1949 |
| 2,516,489 | Stalker | July 25, 1950 |